United States Patent
Hughes

[19]

[11] Patent Number: 6,039,571
[45] Date of Patent: Mar. 21, 2000

[54] GEOGRAPHICAL AREA TERRARIUM

[76] Inventor: Lillie Hughes, 4265 Washington Ferry Rd., Montgomery, Ala. 36108

[21] Appl. No.: 09/209,807

[22] Filed: Dec. 11, 1998

[51] Int. Cl.[7] .................................................. G09B 25/06
[52] U.S. Cl. ........................ 434/151; 434/130; 434/147; 434/150; 119/246; 119/248
[58] Field of Search ..................... 434/130, 147, 434/150, 151; 119/246, 248, 267, 245; D30/101, 102

[56] References Cited

U.S. PATENT DOCUMENTS

| | | | |
|---|---|---|---|
| D. 244,146 | 4/1977 | Chapleau | D30/8 |
| D. 304,246 | 10/1989 | Ross, Jr. et al. | D30/102 |
| 4,240,218 | 12/1980 | Kotzin | 40/407 |
| 5,030,485 | 7/1991 | Meeks et al. | 428/7 |
| 5,069,876 | 12/1991 | Oshinsky | 40/407 |
| 5,597,228 | 1/1997 | Boyle | 362/101 |

Primary Examiner—Robert A. Hafer
Assistant Examiner—Bena B. Miller

[57] ABSTRACT

A terrarium representative of a geographical area is provided including a base and an enclosed housing constructed from a transparent material. Such housing includes a planar front face, a planar rear face and a periphery formed therebetween taking the shape of a border of the geographical area. The housing has an interior space with soil, rocks, and foliage situated therein which are commonly found in the geographical area.

1 Claim, 2 Drawing Sheets

GEOGRAPHICAL AREA TERRARIUM

BACKGROUND OF THE INVENTION

1. Field of the Invention

The present invention relates to terrariums and more particularly pertains to a new geographical area terrarium for displaying various soil, rocks and foliage of a specific geographical area such as a state.

2. Description of the Prior Art

The use of terrariums is known in the prior art. More specifically, terrariums heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,754,571; U.S. Pat. No. 2,595,085; U.S. Pat. Des. No. 304,246; U.S. Pat. Des. No. 244,946; U.S. Pat. Des. No. 371,225; and U.S. Pat. Des. No. 347,091.

In these respects, the geographical area terrarium according to the present invention substantially departs from the conventional concepts and designs of the prior art, and in so doing provides an apparatus primarily developed for the purpose of displaying various soil, rocks and foliage of a specific geographical area such as a state.

SUMMARY OF THE INVENTION

In view of the foregoing disadvantages inherent in the known types of terrariums now present in the prior art, the present invention provides a new geographical area terrarium construction wherein the same can be utilized for displaying various soil, rocks and foliage of a specific geographical area such as a state.

The general purpose of the present invention, which will be described subsequently in greater detail, is to provide a new geographical area terrarium apparatus and method which has many of the advantages of the terrariums mentioned heretofore and many novel features that result in a new geographical area terrarium which is not anticipated, rendered obvious, suggested, or even implied by any of the prior art terrariums, either alone or in any combination thereof.

To attain this, the present invention generally comprises a base defined by a top face and a bottom face each with a generally planar rectangular configuration and a thin periphery formed therebetween. Such periphery is formed of an elongated front face, an elongated rear face, and a pair of short side faces. The front face of the base has a rectangular recess formed therein between the top face and the bottom face. Ideally, the recess is positioned adjacent one of the side faces of the periphery of the base. In use, a study guide may be removably positioned within the recess which contains information regarding the specific geographical area. Also included is a completely enclosed housing constructed from a transparent material. Such housing includes a planar front face, a planar rear face and a periphery formed therebetween taking the shape of a border of the geographical area. The periphery of the housing has a width less than a width of the base. The housing is further coupled to the base and extends upwardly therefrom such that the front face and the rear face of the housing are spaced from the front face and the rear face of the base, respectively. Ideally, at least one stanchion is coupled to the base and extends upwardly therefrom for supporting the housing. In operation, the housing has an interior space with soil, rocks, and foliage situated therein which are commonly found in the geographical area. In the preferred embodiment, indicia is positioned on at least one of the front face and the rear face of the housing for representing cities and bodies of water in the geographical region. Finally, an audio box includes a housing positioned between the top face of the base and the housing. A speaker is mounted on a front face of the housing for emitting audio signals upon the receipt thereof. Also mounted on the front face of the housing is a volume dial for selectively determining a magnitude of the audio signals. An actuation button is mounted on the front face of the housing for effecting the emission of audio signals from the speaker representative of information regarding the geographical region upon the depression thereof.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new geographical area terrarium apparatus and method which has many of the advantages of the terrariums mentioned heretofore and many novel features that result in a new geographical area terrarium which is not anticipated, rendered obvious, suggested, or even implied by any of the prior art terrariums, either alone or in any combination thereof.

It is another object of the present invention to provide a new geographical area terrarium which may be easily and efficiently manufactured and marketed.

It is a further object of the present invention to provide a new geographical area terrarium which is of a durable and reliable construction.

An even further object of the present invention is to provide a new geographical area terrarium which is susceptible of a low cost of manufacture with regard to both materials and labor, and which accordingly is then susceptible of low prices of sale to the consuming public, thereby making such geographical area terrarium economically available to the buying public.

Still yet another object of the present invention is to provide a new geographical area terrarium which provides in the apparatuses and methods of the prior art some of the advantages thereof, while simultaneously overcoming some of the disadvantages normally associated therewith.

Still another object of the present invention is to provide a new geographical area terrarium for displaying various soil, rocks and foliage of a specific geographical area such as a state.

Even still another object of the present invention is to provide a new geographical area terrarium that includes a base and an enclosed housing constructed from a transparent material. Such housing includes a planar front face, a planar rear face and a periphery formed therebetween taking the shape of a border of the geographical area. The housing has an interior space with soil, rocks, and foliage situated therein which are commonly found in the geographical area.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
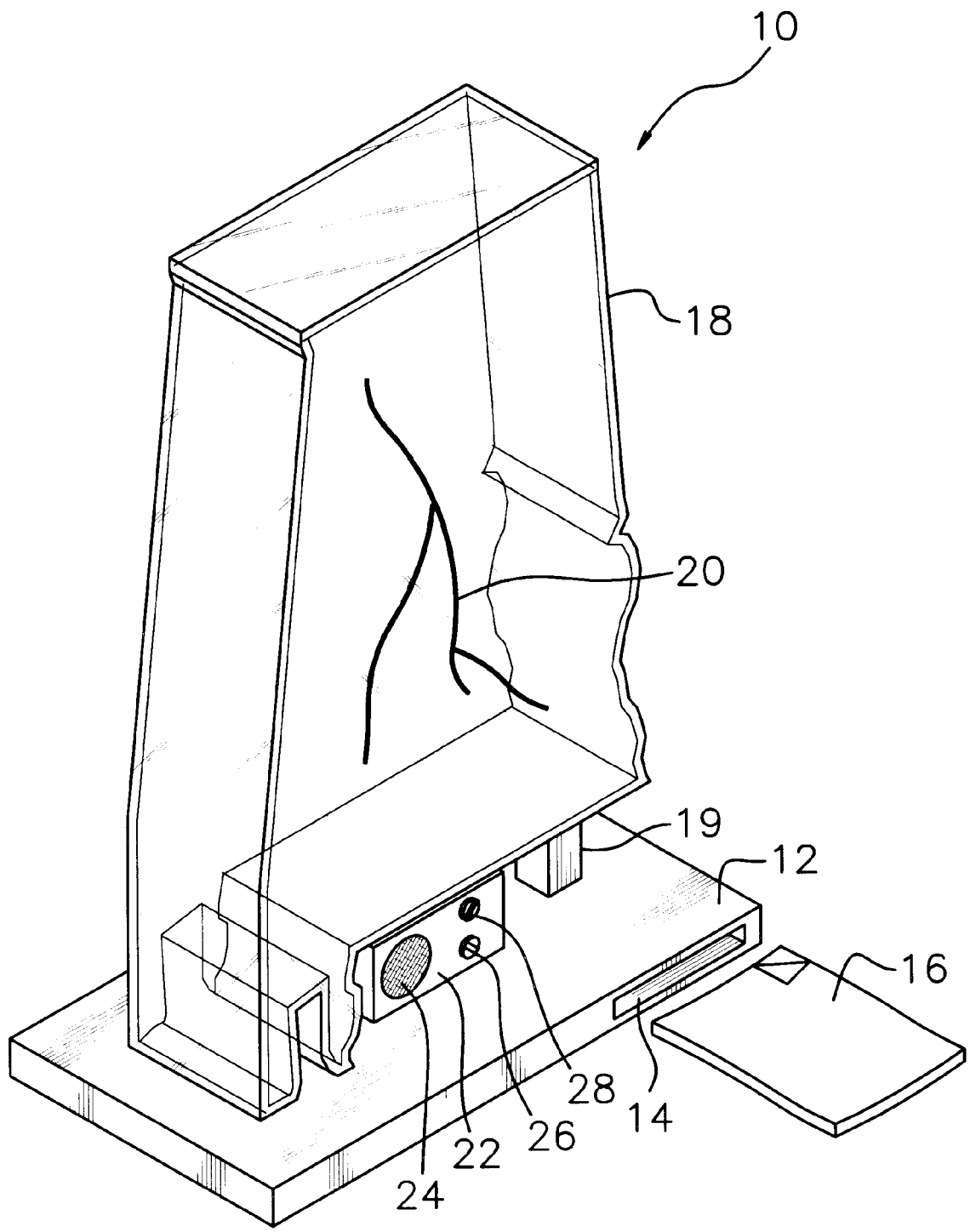
FIG. 1 is a perspective view of a new geographical area terrarium according to the present invention.
Figure 2:
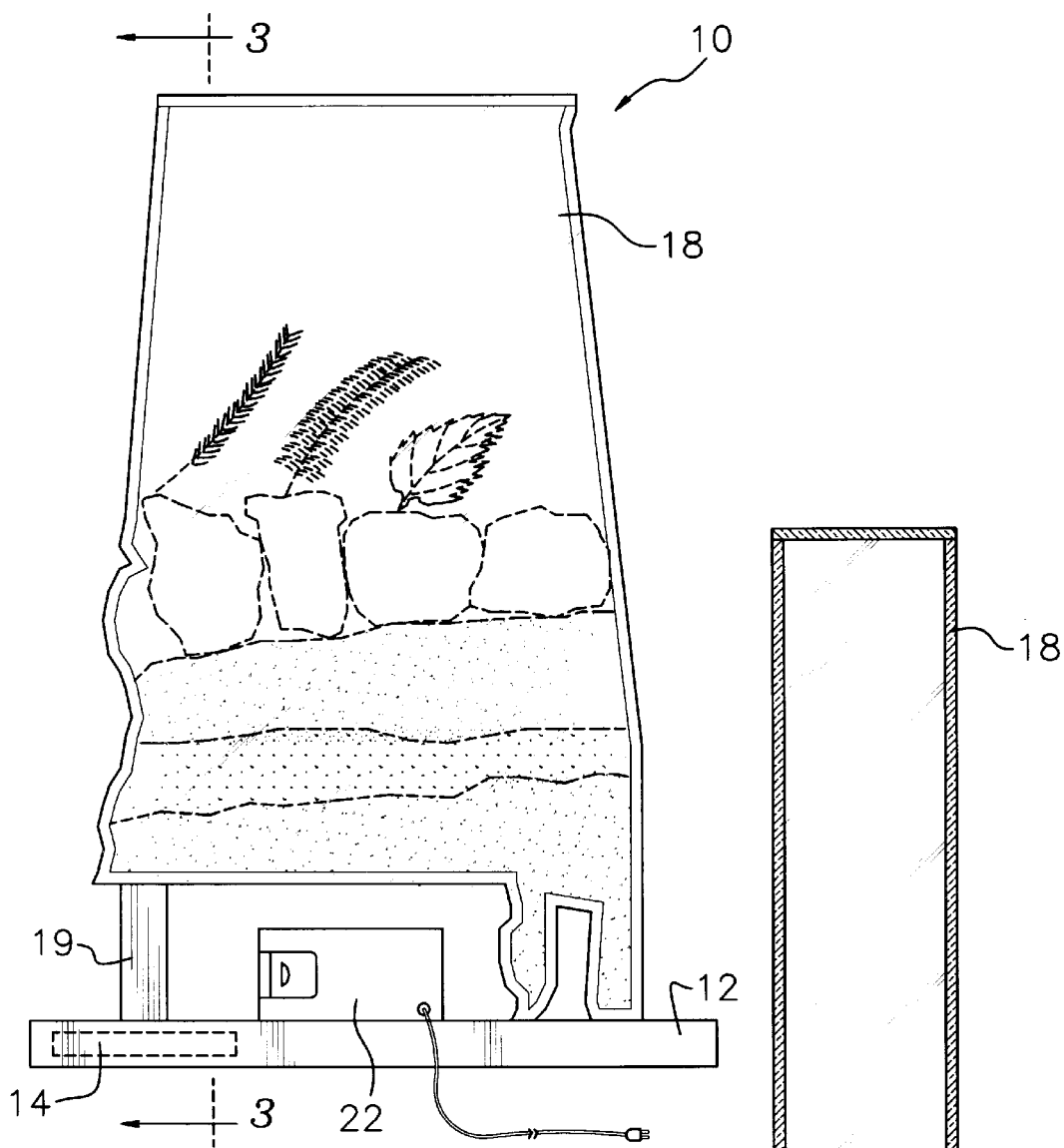
FIG. 2 is a front view of the present invention.
Figure 3:
FIG. 3 is a side cross-sectional view of the present invention.

With reference now to the drawings, and in particular to FIGS. 1 through 3 thereof, a new geographical area terrarium embodying the principles and concepts of the present invention and generally designated by the reference numeral 10 will be described.

The present invention, designated as numeral 10, includes a base 12 defined by a top face and a bottom face each with a generally planar rectangular configuration and a thin periphery formed therebetween. Such periphery is formed of an elongated front face, an elongated rear face, and a pair of short side faces. The front face of the base has a rectangular recess 14 formed therein between the top face and the bottom face. Ideally, the recess is positioned adjacent one of the side faces of the periphery of the base. In use, a study guide 16 may be removably positioned within the recess which contains information regarding a specific geographical area.

Also included is a completely enclosed housing 18 constructed from a transparent material. Such housing includes a planar front face, a planar rear face and a periphery formed therebetween taking the shape of a border of the geographical area. The periphery of the housing has a width less than a width of the base. The housing is further coupled to the base and extends upwardly therefrom such that the front face and the rear face of the housing are spaced from the front face and the rear face of the base, respectively. As an option the top face of the housing may be removably coupled to the remaining portion of the housing for allowing access to the interior space thereof.

Ideally, at least one stanchion 19 is coupled to the base and extends upwardly therefrom for supporting the housing above the base. In operation, the housing has an interior space with soil, rocks, and foliage situated therein which are commonly found in the geographical area. In the preferred embodiment, indicia 20 is positioned on at least one of the front face and the rear face of the housing for representing cities(i.e. capital) and outlines of bodies of water in the geographical region.

Finally, an audio box 22 includes a housing positioned between the top face of the base and the housing. A speaker 24 is mounted on a front face of the housing for emitting audio signals upon the receipt thereof. Also mounted on the front face of the housing is a volume dial 26 for selectively determining a magnitude of the audio signals. An actuation button 28 is mounted on the front face of the housing for effecting the emission of audio signals from the speaker which are representative of information regarding the geographical region. As an option, the audio box may be equipped with a tape player or the like for generating the informative audio signals.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A terrarium representative of a geographical area comprising, in combination:

a base defined by a top face with a generally planar rectangular configuration, a bottom face with a generally planar rectangular configuration, and a thin periphery formed therebetween and comprising an elongated front face, an elongated rear face, and a pair of short side faces, the front face having a rectangular recess formed therein between the top face and the bottom face and positioned adjacent one of the side faces of the periphery of the base, wherein a study guide may be removably positioned in the recess which contains information regarding the specific geographical area;

an enclosed housing constructed from a transparent material and including a planar front face bounded by a front face peripheral edge, a planar rear face bounded by a rear face peripheral edge aligned with said front face peripheral edge, and a peripheral wall extending between said front face peripheral edge and said rear face peripheral edge and orthogonal to the front face and the rear face wherein the peripheral wall of the housing has a width less than a width of the base a portion of the peripheral wall being coupled to the base and extending upwardly from the base such that the front face and the rear face of the housing are spaced from a front face and a rear face of the base, respectively, and the front and rear faces of the housing are in parallel relationship, wherein at least one stanchion is coupled to the base and extended upwardly therefrom for supporting the housing, the housing having an interior space with soil, rocks, and foliage situated therein which are commonly found in the geographical area;

indicia positioned on at least one of the front face and the rear face of the housing for representing cities and bodies of water in the geographical region; and an audio assembly including a housing positioned between the top face of the base and the enclosed housing, a speaker mounted on a front face of the housing for emitting audible sounds upon the receipt of audio signals, a volume dial mounted on the front face of the housing for selectively determining a magnitude of the audible signals, and an actuation button mounted on the front face of the housing for effecting the emission of audible sounds from the speaker representative of information regarding the geographical region upon the depression of the actuation button.

* * * * *